(12) United States Patent
Liu

(10) Patent No.: US 12,039,155 B2
(45) Date of Patent: Jul. 16, 2024

(54) SCREEN CONTENT MAGNIFICATION METHOD AND DEVICE, AND COMPUTER READABLE STORAGE MEDIUM

(71) Applicant: GOERTEK INC., Shandong (CN)

(72) Inventor: Jing Liu, Shandong (CN)

(73) Assignee: GOERTEK INC., Weifang (CN)

( * ) Notice: Subject to any disclaimer, the term of this patent is extended or adjusted under 35 U.S.C. 154(b) by 0 days.

(21) Appl. No.: 18/044,985

(22) PCT Filed: Dec. 15, 2020

(86) PCT No.: PCT/CN2020/136321
§ 371 (c)(1),
(2) Date: Mar. 11, 2023

(87) PCT Pub. No.: WO2022/057118
PCT Pub. Date: Mar. 24, 2022

(65) Prior Publication Data
US 2023/0359338 A1    Nov. 9, 2023

(30) Foreign Application Priority Data

Sep. 18, 2020    (CN) .......................... 202010992490.3

(51) Int. Cl.
*G06F 3/04845* (2022.01)
*G06F 3/042* (2006.01)
(Continued)

(52) U.S. Cl.
CPC ........ *G06F 3/04845* (2013.01); *G06F 3/0425* (2013.01); *G06F 3/0488* (2013.01);
(Continued)

(58) Field of Classification Search
CPC .. G06F 3/04845; G06F 3/0425; G06F 3/0488; G06F 2203/04108; G06F 2203/04806; G06T 2207/30196
See application file for complete search history.

(56) References Cited

U.S. PATENT DOCUMENTS 9,898,183 B1 *   2/2018  Zhou ..................... G06F 3/0485
2008/0273755 A1 * 11/2008  Hildreth ................ G06F 1/1626
345/158
(Continued)

FOREIGN PATENT DOCUMENTS

CN        101661329 A     3/2010
CN        102073454 A     5/2011
(Continued)

OTHER PUBLICATIONS

International Search Report from International Application No. PCT/CN2020/136321 mailed Jun. 18, 2021.

*Primary Examiner* — David Tung
(74) *Attorney, Agent, or Firm* — Shih IP Law Group, PLLC

(57) ABSTRACT

A screen content magnification method and device, and a computer readable storage medium. The method includes steps of: starting an magnifier function after a starting instruction of the magnifier function is detected, starting a camera device to acquire an area image of a preset area, and detecting whether a finger image corresponding to the finger of a user exists in the area image; if it is detected that a finger image exists in the area image, determining, on the basis of the finger image, position coordinates of the finger of the user in the area image; and determining size data of a touch screen, determining, on the basis of the size data and the position coordinates, a corresponding position to be magnified, and magnifying, on the basis of the magnifier function, screen content of a position area corresponding to the position.

9 Claims, 4 Drawing Sheets

(51) Int. Cl.
*G06F 3/0488* (2022.01)
*G06T 7/60* (2017.01)
*G06T 7/70* (2017.01)

(52) U.S. Cl.
CPC .................. *G06T 7/60* (2013.01); *G06T 7/70* (2017.01); *G06F 2203/04108* (2013.01); *G06F 2203/04806* (2013.01); *G06T 2200/24* (2013.01); *G06T 2207/30196* (2013.01)

(56) References Cited

U.S. PATENT DOCUMENTS

| | | | |
|---|---|---|---|
| 2012/0278712 | A1 | 11/2012 | Wright et al. |
| 2015/0022473 | A1* | 1/2015 | Ye .......................... G06F 3/0488 345/173 |
| 2016/0062452 | A1 | 3/2016 | Kim et al. |
| 2017/0364730 | A1* | 12/2017 | Jiang ...................... G06V 40/67 |

FOREIGN PATENT DOCUMENTS

| | | | |
|---|---|---|---|
| CN | 102298504 | A | 12/2011 |
| CN | 102402680 | A | 4/2012 |
| CN | 102890607 | A | 1/2013 |
| CN | 103984489 | A | 8/2014 |
| CN | 104331191 | A | 2/2015 |
| CN | 104656903 | A | 5/2015 |
| CN | 106569635 | A | 4/2017 |
| CN | 106896913 | A | 6/2017 |
| CN | 108171155 | A | 6/2018 |

\* cited by examiner

SCREEN CONTENT MAGNIFICATION METHOD AND DEVICE, AND COMPUTER READABLE STORAGE MEDIUM

This application claims the priority to Chinese Patent Application No. 202010992490.3, titled "SCREEN CONTENT MAGNIFICATION METHOD AND DEVICE, AND COMPUTER READABLE STORAGE MEDIUM", filed on Sep. 18, 2020, which is incorporated by reference as if fully set forth herein.

TECHNICAL FIELD

The present disclosure relates to a technical field of wristband display and mobile terminal, and in particular to a screen content magnification method, device and computer readable storage medium.

BACKGROUND ART

At present, screen content magnification methods (i.e., magnification method) mainly include an overall magnification method and a touch position magnification method. The overall magnification method is mainly suitable for electronic devices with larger screens such as mobile terminals. For watches and bracelets, since the screens of watches and bracelets are small, the overall magnification brings a poor experience effect to the user, and is not conducive to the user's operation. The touch position magnification method mainly recognizes a touch position of the user's finger, and then magnifies and displays the screen content corresponding to the touch position. Since the user's finger touches the screen, part of the display content on the screen is blocked, so that the user's experience effect is poor. It can be seen that the experience effect of the current screen content magnification methods is poor.

SUMMARY

A main object of the present disclosure is to provide a screen content magnification method and device, and a computer readable storage medium, aiming at solving the technical problem of poor experience effect of the current screen content magnification methods.

In order to achieve the above object, the present disclosure provides a screen content magnification method including:

starting an magnifier function after a starting instruction of the magnifier function is detected, turning on a camera device to acquire an area image of a preset area, and detecting whether a finger image corresponding to the finger of a user exists in the area image;

if it is detected that a finger image exists in the area image, determining position coordinates of the finger of the user in the area image on the basis of the finger image; and determining size data of a touch screen, determining a corresponding position to be magnified on the basis of the size data and the position coordinates, and magnifying screen content of a position area corresponding to the position to be magnified on the basis of the magnifier function.

Optionally, determining size data of a touch screen, and determining a corresponding position to be magnified on the basis of the size data and the position coordinates includes:

determining pixel data of the area image and size data of the touch screen, and determining corresponding position mapping multiple according to the pixel data and the size data; and determining a position to be magnified in the touch screen according to the position coordinates and the position mapping multiple.

Optionally, magnifying screen content of a position area corresponding to the position to be magnified on the basis of the magnifier function includes:

determining a proportion size of the finger image and the area image, and determining a corresponding distance between the user's finger and the touch screen based on the proportion size; and determining a corresponding magnification according to the distance, and magnifying screen content of a position area corresponding to the position to be magnified on the basis of the magnifier function and the magnification.

Optionally, if it is detected that a finger image exists in the area image, determining position coordinates of the finger of the user in the area image on the basis of the finger image includes:

if it is detected that a finger image exists in the area image, detecting whether the finger image is within a preset edge position of the area image;

if it is detected that the finger image is within the preset edge position of the area image, detecting whether a image proportion of the finger image in the area image is less than or equal to a preset ratio; and if it is detected that the image proportion of the finger image in the area image is less than or equal to the preset ratio, determining position coordinates of the finger of the user in the area image on the basis of the finger image.

Optionally, determining position coordinates of the finger of the user in the area image on the basis of the finger image includes:

determining a position relationship between the finger image and the area image, and determining a proportion relationship between the finger image and the area image; and determining position coordinates of the finger of the user in the area image on the basis of the position relationship and the proportion relationship.

Optionally, after determining a corresponding position to be magnified on the basis of the size data and the position coordinates, and magnifying screen content of a position area corresponding to the position on the basis of the magnifier function, the method further includes:

determining offset positions corresponding to the finger image, and determining a first moving distance of the finger of the user on the basis of the offset positions;

determining a corresponding moving multiple based on the size data of the touch screen, and determining a second moving distance corresponding to the position to be magnified on the basis of the first moving distance and the moving multiple; and determining a first target position after adjusting the position to be magnified by the second moving distance, and magnifying screen content of the position area corresponding to the first target position on the basis of the magnifier function.

Optionally, after determining offset positions corresponding to the finger image, and determining a first moving distance of the finger of the user on the basis of the offset positions, the method further includes:

detecting whether a second target position corresponding to the finger of the user after moving the first moving distance is within a preset area;

if it is detected that the second target position is outside the preset area, detecting whether the finger of the user exists in the preset area within a first preset duration; and if it is detected that the finger of the user does not exist in the preset area within the first preset duration, turning off the magnifier function.

Optionally, after detecting whether a finger image corresponding to the finger of a user exists in the area image, the method further includes:

if it is detected that the finger image does not exist in the area image, sending a prompt message that the finger of the user is not detected;

detecting whether the finger of the user exists in the preset area within a second preset duration; and if it is detected that the finger of the user does not exist in the preset area within the second preset duration, turning off the magnifier function.

In addition, in order to achieve the above object, the present disclosure also provides an electronic device, the electronic device including a memory, a processor, and a screen content magnification program stored in the memory and executable on the processor, wherein when the screen content magnification program is executed by the processor, steps of the screen content magnification method as described above are implemented.

In addition, in order to achieve the above object, the present disclosure also provides a computer readable storage medium, wherein a screen content magnification program is stored on the computer readable storage medium, and wherein when the screen content magnification program is executed by a processor, steps of the screen content magnification method as described above are implemented.

According to the present disclosure, disclosed is a screen content magnification method including: starting an magnifier function after a starting instruction of the magnifier function is detected, turning on a camera device to acquire an area image of a preset area, and detecting whether a finger image corresponding to the finger of a user exists in the area image; if it is detected that a finger image exists in the area image, determining position coordinates of the finger of the user in the area image on the basis of the finger image; and determining size data of a touch screen, determining a corresponding position to be magnified on the basis of the size data and the position coordinates, and magnifying screen content of a position area corresponding to the position on the basis of the magnifier function. It can be seen that in the present disclosure, in the process of magnifying the screen content, it is detected whether a finger image exists in the area image of a preset area, if it is detected that a finger image exists, a corresponding position to be magnified in the screen is determined according to the size data of the touch screen and the position coordinates of the finger of the user, and screen content of the position area corresponding to the position to be magnified is magnified. In the present disclosure, a user can move the corresponding position to be magnified in the touch screen by moving the finger of the user, and the screen content of the position area corresponding to the position to be magnified can be magnified, and the user does not need to touch the screen with his finger, thereby preventing the user's fingers from covering the screen content on the touch screen. Furthermore, in the present disclosure, a corresponding position to be magnified is determined according to the size data of the touch screen, and the position area corresponding to the position to be magnified is partially magnified to optimize the magnification effect of electronic devices with small screens, thereby solving the problem of poor screen content magnification effect of electronic devices with small screens, and improving the use experience effect of users.

BRIEF DESCRIPTION OF THE DRAWINGS

In order to more clearly describe the technical solutions in the embodiments of the present disclosure or in the prior art, the following will briefly introduce the drawings required for the description of the embodiments or the prior art. Obviously, the drawings in the following description are only a part of drawings of the disclosure, and for persons of ordinary skill in the art, other drawings can also be obtained according to the provided drawings without any creative effort.

DETAILED DESCRIPTION OF THE EMBODIMENTS

The following will describe the technical solutions in the embodiments of the present disclosure in combination with the drawings in the embodiments of the present disclosure. Obviously, the described embodiments are only part of the embodiments of the present disclosure, rather than all the embodiments. Based on the embodiments according to the present disclosure, all other embodiments obtained by persons of ordinary skill in the art without creative efforts shall fall within the protection scope of the present disclosure.

Figure 1:
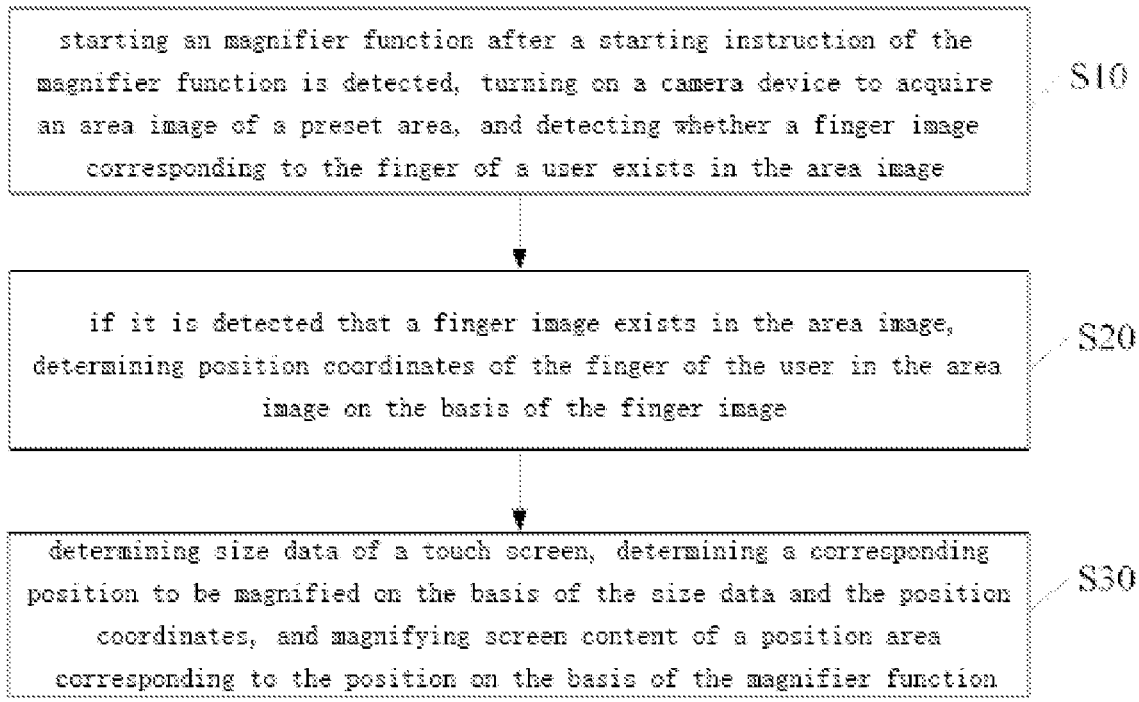
FIG. 1 is a flowchart of a screen content magnification method according to a first embodiment of the present disclosure.
Figure 2:
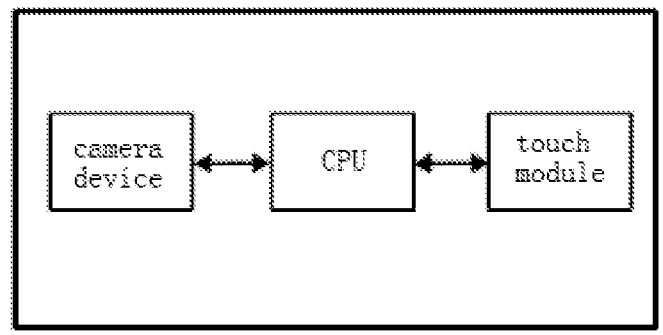
FIG. 2 is a system block diagram of an electronic device according to the present disclosure.
Figure 3:
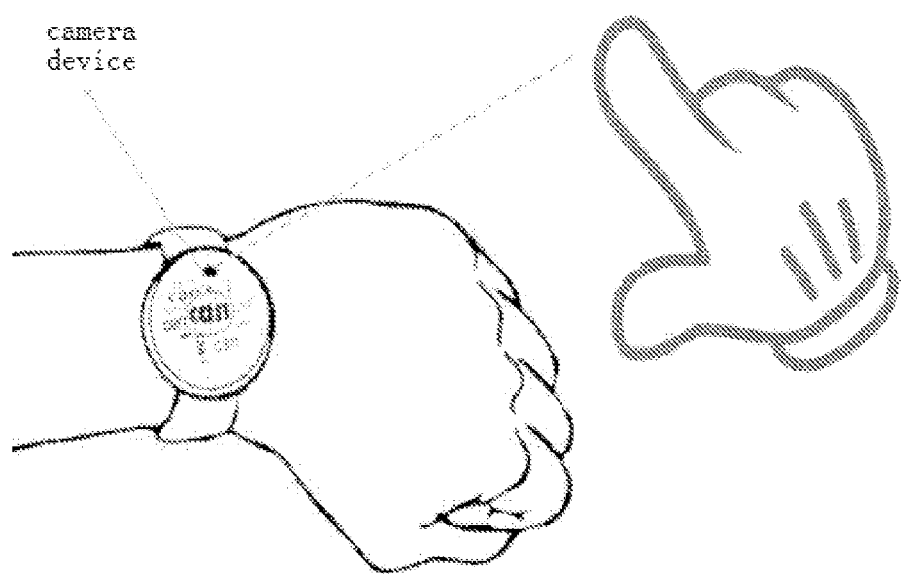
FIG. 3 is a schematic diagram of the screen content magnification method according to the present disclosure.

Referring to FIG. 1, the present disclosure provides a screen content magnification method. FIG. 1 is a flowchart of a screen content magnification method according to a first embodiment of the present disclosure. FIG. 2 is a system block diagram of an electronic device according to the present disclosure. FIG. 3 is a schematic diagram of the screen content magnification method according to the present disclosure.

The present disclosure provides embodiments of the screen content magnification method. It should be noted that although a logic sequence is shown in the flowchart, in some cases, steps shown or described may be completed in a different sequence.

The screen content magnification method includes:

Step S10, starting an magnifier function after a starting instruction of the magnifier function is detected, turning on a camera device to acquire an area image of a preset area, and detecting whether a finger image corresponding to the finger of a user exists in the area image.

An electronic device includes a central processing unit (CPU), a camera device module (camera device) and a touch module (Touch). The central processing unit is communicated with the camera device and the touch module, the camera device is used to capture an area image of a preset area, and the touch module is used to start an magnifier function of a touch screen.

After the electronic device, including but not limited to wearable devices such as watches and bracelets, and mobile terminals such as mobile phones and locators, is powered on and initialized, if a touch module in the electronic device recognizes that a user has continuously clicked a designated area of the touch screen of the electronic device for a preset number of times, the touch module transmits corresponding prompt message to the central processing unit, prompting that a starting instruction of the magnifier function of the electronic device has been triggered, and at the same time, the touch module starts the magnifier function of the touch screen, but a screen magnifier corresponding to the magnifier function, which is a virtual screen magnifier corresponding to the magnifier function, is not displayed on the touch screen. After the starting instruction of the magnifier function is detected by the central processing unit, the camera device in the electronic device is turned on and the camera device acquires an area image of a preset area, and the central processing unit detects whether a finger image corresponding to the finger of a user exists in the area image acquired by the camera device. If it is detected by the central processing unit that a finger image corresponding to the finger of a user exists in the area image, the central processing unit determines that the user needs to magnify corresponding screen content in the touch screen, and the screen content is magnified through the magnifier function. If it is detected by the central processing unit that a finger image corresponding to the finger of a user does not exist in the area image, the central processing unit determines that the user has touched the touch screen by mistake, and turns off the magnifier function and the camera device.

Here, the preset number of times, the designated area and the preset area are set according to the needs of the user, and are not limited in the embodiment. It should be noted that, by default, the preset number of times in the embodiment is 3 times, and the preset area and the designated area are areas directly above the camera device.

It should be noted that after recognizing that the user has clicked the touch screen for three consecutive times, the touch module may immediately send a prompt message to the central processing unit, and the central processing unit may immediately turn on the camera device to capture a preset area. Since the user has not yet had time to place the finger in the preset area, if the central processing unit immediately detects whether a finger image exists in the area image acquired by the camera device, a misjudgment may be caused. In order not to affect the user experience, in the embodiment, the camera device is set to delay a first preset duration to capture the preset area, and the central processing unit detects whether a finger image corresponding to the finger of the user exists in the area image, and if it is detected by the central processing unit that a finger image does not exist in the area image within a second preset duration, the central processing unit determines that the user touches the touch screen by mistake, and turns off the magnifier function and the camera device.

Here, the first preset duration and the second preset duration are set according to the needs of the user, and are not limited in the embodiment. It should be noted that, by default, the first preset duration in the embodiment is 2 seconds, the second preset duration is 3 seconds.

Step S20, if it is detected that a finger image exists in the area image, determining position coordinates of the finger of the user in the area image on the basis of the finger image.

If it is detected by the central processing unit that a finger image corresponding to the finger of the user in the area image acquired by the camera device, the central processing unit determines position coordinates of the finger of the user in the area image according to the position and size of the finger image in the area image, and then determines, on the basis of the position coordinates corresponding the finger of the user, the screen content of the corresponding position area in the touch screen needs to be magnified, and a screen magnifier corresponding to the magnifier function is displayed in the area corresponding to the touch screen, and then screen content in the position area to be magnified in the touch screen is magnified by the screen magnifier.

Further, the step S20 includes:
Step a, if it is detected that a finger image exists in the area image, detecting whether the finger image is within a preset edge position of the area image;
Step b, if it is detected that the finger image is within the preset edge position of the area image, detecting whether a image proportion of the finger image in the area image is less than or equal to a preset ratio; and
Step c, if it is detected that the image proportion of the finger image in the area image is less than or equal to the preset ratio, determining position coordinates of the finger of the user in the area image on the basis of the finger image.

Specifically, if it is detected by the central processing unit that a finger image corresponding to the finger of the user exists in the area image, the central processing unit detects whether the finger image is within a preset edge position of the area image; if it is detected by the central processing unit that the finger image is within the preset edge position of the area image, the central processing unit determines that the area where the finger of the user is placed is correct, and detects whether a image proportion of the finger image in the area image is less than or equal to a preset ratio; if it is detected by the central processing unit that the image proportion of the finger image in the area image is greater than the preset ratio, the central processing unit determines that a distance between the user's finger and the touch screen is too close, and sends a corresponding prompt message to prompt the user to adjust the distance between the user's finger and the touch screen. If it is detected by the central processing unit that the image proportion of the finger image in the area image is less than or equal to the preset ratio, the central processing unit determines that the distance between the user's finger and the touch screen is correct, and determines that position coordinates of the finger of the user in the area image on the basis of the finger image, and a screen magnifier corresponding to the magnifier function is displayed at a preset position on the touch screen. If it is detected by the central processing unit that the finger image is outside the preset edge position of the area image, the central processing unit determines that the area where the finger of the user is placed is an invalid area, and sends a corresponding prompt message to prompt the user to adjust the finger of the user to a correct area.

Here, the preset edge position, the preset ratio and the preset position are set according to actual conditions, and are not limited in the embodiment.

It should be noted that only when it is detected by the central processing unit that a finger image corresponding to the finger of the user exists in the area image, the screen magnifier corresponding to the magnifier function may be displayed on the touch screen, and when no finger image corresponding to the finger of the user in the area image is detected, although the magnifier function is started, a screen magnifier corresponding to the magnifier function is not displayed on the touch screen.

Further, the screen content magnification method also includes:

Step d, if it is detected that the finger image does not exist in the area image, sending a prompt message that the finger of the user is not detected;

Step e, detecting whether the finger of the user exists in the preset area within a second preset duration; and Step f, if it is detected that the finger of the user does not exist in the preset area within the second preset duration, turning off the magnifier function.

Specifically, if it is detected by the central processing unit that a finger image corresponding to the finger of the user exists in the area image, the central processing unit sends a corresponding prompt message to prompt the user to adjust the finger of the user to the preset area, and detects whether the finger of the user exists in the preset area within a second preset duration; and if it is detected by the central processing unit that the finger of the user does not exist in the preset area within the second preset duration, the central processing unit turns off the magnifier function and the camera device. If it is detected by the central processing unit that the finger of the user exists in the preset area within the second preset duration, the central processing unit determines that the finger of the user is already in the preset area, and a screen magnifier corresponding to the magnifier function is displayed at a corresponding position on the touch screen.

Further, the step c includes:

Step g, determining a position relationship between the finger image and the area image, and determining a proportion relationship between the finger image and the area image; and Step h, determining position coordinates of the finger of the user in the area image on the basis of the position relationship and the proportion relationship.

Specifically, the central processing unit determines a coverage area of the finger image in the area image, determines an orientation, including but not limited to southeast, northeast, southwest and northwest, of the finger image in the area image through the coverage area, and then determines a proportion size of the finger image in the orientation in the area image, converts a length and a width of the proportion size into a horizontal ordinate and a longitudinal coordinate corresponding to the orientation, and determines position coordinates of the finger of the user in the area image according to the horizontal ordinates and the longitudinal coordinates.

Step S30, determining size data of a touch screen, determining a corresponding position to be magnified on the basis of the size data and the position coordinates, and magnifying screen content of a position area corresponding to the position to be magnified on the basis of the magnifier function.

The central processing unit obtains device data in the electronic device, and obtains size data of corresponding touch screen of the electronic device by analyzing the device data, and determines corresponding position mapping multiple that is scaling size of position mapping and magnification according to the size data, and then determine the corresponding position to be magnified in the touch screen according to the position mapping multiple and the position coordinates corresponding to the finger of the user, then a screen magnifier corresponding to the magnifier function is displayed at the position to be magnified, and an magnified area of the screen magnifier is determined, and screen content of a position area corresponding to the position to be magnified is magnified on the basis of the magnifier function and the magnification, wherein the position area corresponding to the position to be magnified is magnified is the magnified area of the screen magnifier.

It should be noted that the shape of the screen magnifier may be a square, a rectangle and a circle, but is not limited thereto, and may be set according to the needs of the user, and are not limited in the embodiment. By default, the shape of the screen magnifier in the embodiment is a circle.

Further, the step S30 includes:

Step i, determining pixel data of the area image and size data of the touch screen, and determining corresponding position mapping multiple according to the pixel data and the size data; and Step j, determining a position to be magnified in the touch screen according to the position coordinates and the position mapping multiple.

Specifically, the central processing unit determines pixel sizes of the area image, and determines sizes of the touch screen, and divides the sizes of the touch screen by the pixel sizes of the area image to obtain corresponding calculated quotient values that are corresponding position mapping multiples, respectively, and then multiplies the position coordinates corresponding to the finger of the user by the position mapping multiples to obtain multiplied position coordinates, respectively, and the multiplied position coordinates are determined as positions to magnified in the touch screen.

In the embodiment, for example, the pixel size of the area image is 1000*800, the size of the touch screen is 600*200, the position coordinates corresponding to the finger of the user are (x, y), and the position mapping multiples calculated by the central processing unit are 600/1000=0.6 and 200/800=0.25, accordingly, the calculated position to be magnified in the touch screen is (0.6x, 0.25y).

Further, the method includes:

Step k, determining a proportion size of the finger image and the area image, and determining a corresponding distance between the user's finger and the touch screen based on the proportion size; and Step l, determining a corresponding magnification according to the distance, and magnifying screen content of a position area corresponding to the position to be magnified on the basis of the magnifier function and the magnification.

Specifically, the central processing unit determines a coverage area of the finger image captured by the camera device relative to the area image, determines a proportion size of the finger image in the area image according to the coverage area, and calculates a corresponding distance between the finger of the user and the touch screen based on the proportion size, and then determines a magnification of the screen magnifier corresponding to the distance through a distance magnification list, wherein the distance magnification list is a mapping table of the distance and its corresponding magnification, wherein the screen magnifier magnifies screen content of the position area corresponding to the position to be magnified on the basis of the magnification.

Here, the distance between the finger of the user and the touch screen is inversely proportional to the magnification, that is, the smaller the distance between the finger of the user and the touch screen, the larger the corresponding magnification, and the larger the distance between the finger of the user and the touch screen, the smaller the corresponding magnification.

In the embodiment, for example, the screen magnifier corresponding to the magnifier function has a circular shape, with a radius r of 1 cm (centimeter), and the pixel size of the area image is 1000*800, the size of the touch screen is 600*200, corresponding position coordinates of the finger of the user are (x, y), the position mapping multiples calculated by the central processing unit are 600/1000=0.6 and 200/800=0.25, the calculated position to be magnified in the touch screen is (0.6x, 0.25y), and the calculated magnified area of the screen magnifier is $S=\pi r^2=\pi$ (cm$^2$), then the screen magnifier takes the position to be magnified (0.6x, 0.25y) as the center for magnification, and magnifies the screen content in the position area $\pi$(cm$^2$).

According to the present disclosure, disclosed is a screen content magnification method including: starting an magnifier function after a starting instruction of the magnifier function is detected, turning on a camera device to acquire an area image of a preset area, and detecting whether a finger image corresponding to the finger of a user exists in the area image; if it is detected that a finger image exists in the area image, determining position coordinates of the finger of the user in the area image on the basis of the finger image; and determining size data of a touch screen, determining a corresponding position to be magnified on the basis of the size data and the position coordinates, and magnifying screen content of a position area corresponding to the position on the basis of the magnifier function. It can be seen that in the present disclosure, in the process of magnifying the screen content, it is detected whether a finger image exists in the area image of a preset area, if it is detected that a finger image exists, a corresponding position to be magnified in the screen is determined according to the size data of the touch screen and the position coordinates of the finger of the user, and screen content of the position area corresponding to the position to be magnified is magnified. In the present disclosure, a user can move the corresponding position to be magnified in the touch screen by moving the finger of the user, and the screen content of the position area corresponding to the position to be magnified can be magnified, and the user does not need to touch the screen with his finger, thereby preventing the user's fingers from covering the screen content on the touch screen. Furthermore, in the present disclosure, a corresponding position to be magnified is determined according to the size data of the touch screen, and the position area corresponding to the position to be magnified is partially magnified to optimize the magnification effect of electronic devices with small screens, thereby solving the problem of poor screen content magnification effect of electronic devices with small screens, and improving the use experience effect of users.

Further, the present disclosure provides a screen content magnification method according to a second embodiment.

The screen content magnification method according to the second embodiment differs from the screen content magnification method according to the first embodiment in that the screen content magnification method further includes:

Step m, determining offset positions corresponding to the finger image, and determining a first moving distance of the finger of the user on the basis of the offset positions;

Step n, determining a corresponding moving multiple based on the size data of the touch screen, and determining a second moving distance corresponding to the position to be magnified on the basis of the first moving distance and the moving multiple; and Step o, determining a first target position after adjusting the position to be magnified by the second moving distance, and magnifying screen content of the position area corresponding to the first target position on the basis of the magnifier function.

Specifically, when the user moves the finger, the camera device captures the finger image corresponding to the finger of the user in real time, and the central processing unit analyzes the offset position of each finger image, and analyzes the position relationship and proportion size of each finger image and the area image, determines position coordinates corresponding to the finger of the user, and determines the moving direction and a first moving distance of the finger of the users according to coordinate changes of the position coordinates. The central processing unit obtains device parameters in the electronic device, and determines the type of the electronic device and corresponding size of the touch screen of the electronic device by analyzing the device parameters, and determines a corresponding moving multiple of the touch screen of the electronic device according to a size magnification list that is a mapping table established between the size and the corresponding moving multiple, and then the central processing unit divides the first moving distance by the moving multiple to obtain a calculation quotient value that is a second moving distance corresponding to the position to be magnified, and moves the position to be magnified by the second moving distance in the touch screen according to the moving direction of the finger of the user, wherein the moving direction of the finger of the user is consistent with the moving direction of the position to be magnified. Then, the central processing unit determines a first target position after adjusting the position to be magnified by the second moving distance, and the screen magnifier magnifies the screen content of the position area corresponding to the first target position on the basis of the corresponding magnification.

It should be noted that during the movement of the position to be magnified, when the finger of the user is placed in a certain area and remains stationary, since the finger of the user may slightly shake, the position of the finger of the user captured by the camera device may have a slight change. In order not to affect the user experience, in the embodiment, if it is detected by the central processing unit that the change of the position of the finger of the user in the current finger image and the previous few frames of finger images is within a certain range, the central processing unit sets the position to be magnified as the current position to solve the dithering problem.

In the embodiment, for example, the size magnification list is that: the moving multiple corresponding to the size of the touch screen of a wristband watch may be 1.5, and the moving multiple corresponding to the size of the touch screen of a mobile phone and a tablet may be 1, and the central processing unit determines that the finger of the user moves to the left by 1.5 cm (centimeter) through the coordinate change of the finger of the user; the central processing unit determines that the electronic device is a wristband watch by analyzing the device parameters in the electronic device, and determines that the moving multiple is 1.5, and the position to be magnified is moved to the left by 1 cm on the touch screen.

According to the present disclosure, the method includes determining offset positions corresponding to the finger image, and determining a first moving distance of the finger of the user on the basis of the offset positions; determining a corresponding moving multiple based on the size data of the touch screen, and determining a second moving distance corresponding to the position to be magnified on the basis of the first moving distance and the moving multiple; and determining a first target position after adjusting the position to be magnified by the second moving distance, and magnifying screen content of the position area corresponding to the first target position on the basis of the magnifier function. It can be seen that in the embodiment, in the process of determining the moving distance of the position to be magnified, the movement of the position to be magnified is controlled by the moving distance and direction of the finger of the user, without the need to touch the touch screen of the electronic device, thereby preventing the user's fingers from covering the screen content on the touch screen, which improves the user experience effect.

Further, the present disclosure provides a screen content magnification method according to a third embodiment.

The screen content magnification method according to the third embodiment differs from the screen content magnification method according to the first embodiment and/or the second embodiment in that the screen content magnification method further includes:

Step p, detecting whether a second target position corresponding to the finger of the user after moving the first moving distance is within a preset area;

Step q, if it is detected that the second target position is outside the preset area, detecting whether the finger of the user exists in the preset area within a first preset duration; and Step r, if it is detected that the finger of the user does not exist in the preset area within the first preset duration, turning off the magnifier function.

Specifically, after the finger of the user moves a first moving distance, the central processing unit acquires an area image in a preset area through the camera device, and detects whether a finger image exists in the area image, that is, detects whether a second target position corresponding to the finger of the user after moving the first moving distance is within a preset area. If it is detected by the central processing unit that the second target position is within the preset area, the central processing unit determines a corresponding position to be magnified according to the second target position, and magnifies screen content of the position area corresponding to the position to be magnified according to the corresponding magnification. If it is detected by the central processing unit that the second target position is outside the preset area, the central processing unit sends a corresponding prompt message to prompt the user to adjust the finger of the user to the preset area, and detects whether the finger of the user is adjusted into the preset area within a first preset duration. If it is detected by the central processing unit that finger of the user does not exist in the preset area within the first preset duration, the central processing unit turns off the magnifier function in the touch screen and the camera device. If it is detected by the central processing unit that finger of the user is adjusted into the preset area within the first preset duration, the central processing unit determines a current position corresponding to the finger of the user, and determines a corresponding position to be magnified according to the current position, and magnifies screen content of the position area corresponding to the position to be magnified according to the corresponding magnification.

In the embodiment, it is detected whether the second target position corresponding to the finger of the user after moving the first moving distance is within the preset area; if it is detected that the second target position is outside the preset area, detects whether the finger of the user exists in the preset area within a first preset duration; and if it is detected that the finger of the user does not exist in the preset area within the first preset duration, turns off the magnifier function. It can be seen that in the embodiment, in the process of determining whether the finger of the user is moved into the preset area, it is detected whether the finger of the user is within the preset after moving, and if it is not in the preset area, the user is prompted to move the finger to the preset area, and if it is within the preset area, the screen content of the position area corresponding to the position to be magnified in the touch screen is magnified, thereby improving the user experience effect.

Figure 4:
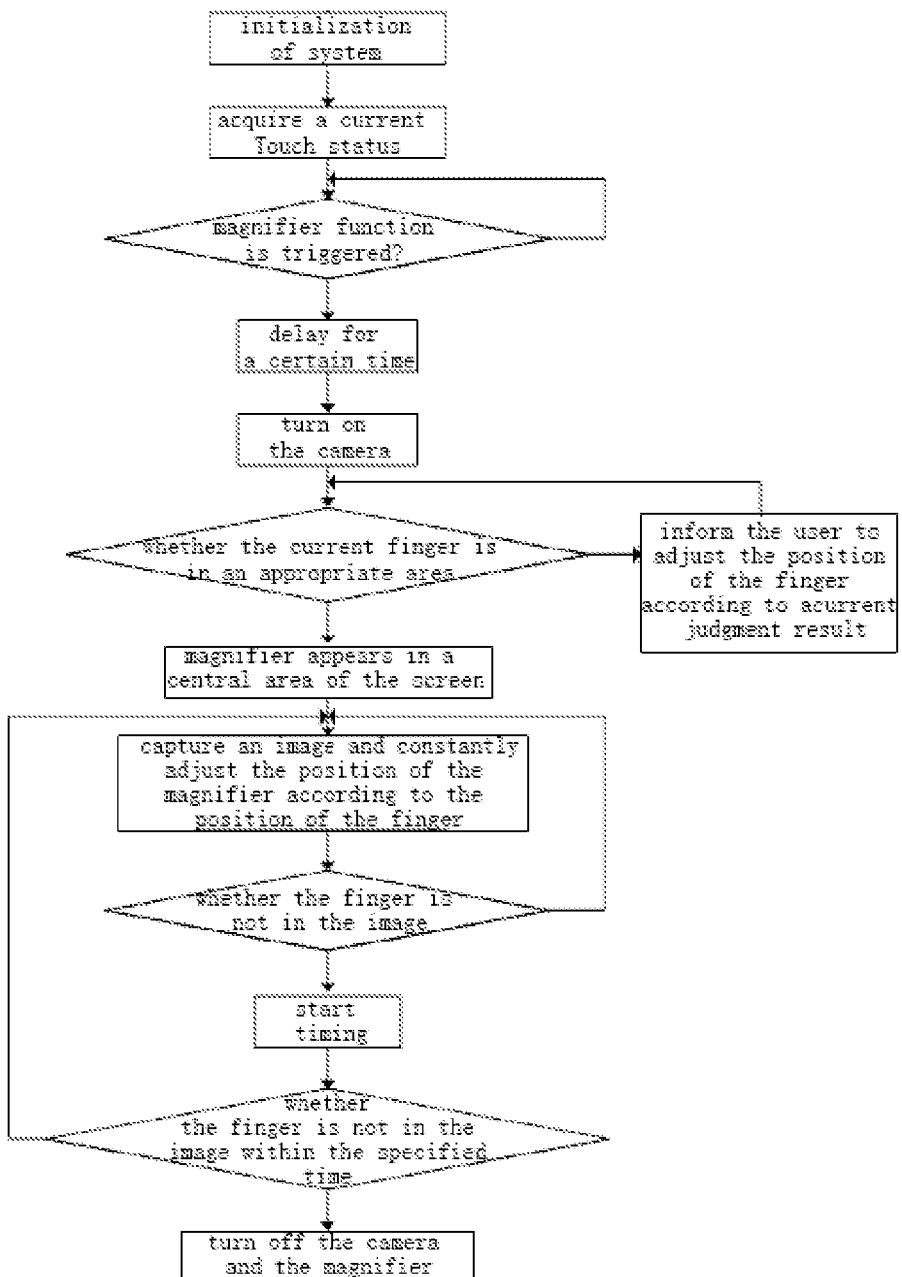
FIG. 4 is a flowchart for implementing the screen content magnification method according to the present disclosure.

Further, as shown in FIG. 4, FIG. 4 is a flowchart for implementing the screen content magnification method according to the present disclosure. After the system of the electronic device is powered on to complete the module initialization function of the touch module and the camera device, the central processing unit obtains a touch state of the current touch module. If the central processing unit acquires that the touch state of the current touch module has been triggered, that is, it is detected that a starting instruction of the magnifier function is detected, the central processing unit delays a preset time to turn on the camera device, the camera device captures an area image of the preset area and detects whether a finger image corresponding to the finger of the user exists in the area image. If it is detected by the central processing unit that a finger image corresponding to the finger of the user exists in the area image, the central processing unit displays a screen magnifier corresponding to the magnifier function in a central area of the touch screen. If it is detected by the central processing unit that a finger image corresponding to the finger of the user does not exist in the area image, the central processing unit sends a corresponding prompt message to prompt the user to adjust the user's finger to the preset area, and then the central processing unit acquires the position of the finger of the user in real time, determines the moving direction and moving distance of the finger of the user according to the position change of the finger of the user, adjusts the moving direction and moving distance of the position to be magnified according to the moving direction and moving distance of the finger of the user, and the central processing unit detects whether the finger of the user is still in the preset area after moving the moving distance. If it is detected by the central processing unit that the finger of the user is still in the preset area after moving the moving distance, the central processing unit magnifies the screen content of the position area corresponding to the position to be magnified in the touch screen through a screen magnifier. If it is detected by the central processing unit that the finger of the user is not in the preset area after moving the moving distance, the central processing unit detects whether the finger of the user is adjusted to the preset area within a specified time. If it is detected by the central processing unit that the finger of the user has not been adjusted to the preset area within a specified time, the central processing unit turns off the camera device and the magnifier function.

Figure 5:
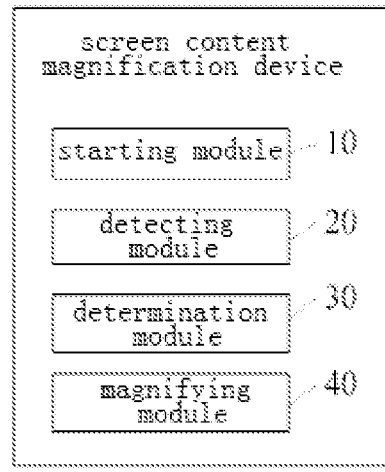
FIG. 5 is a structural diagram of a screen content magnification device according to the present disclosure.

Further, the present disclosure also provides a screen content magnification device. Referring to FIG. 5, the screen content magnification device includes:

a starting module 10 for starting an magnifier function after a starting instruction of the magnifier function is detected, and turning on a camera device to acquire an area image of a preset area;

a detecting module 20 for detecting whether a finger image corresponding to the finger of a user exists in the area image;

a determination module 30 configured that if it is detected that a finger image exists in the area image, determines position coordinates of the finger of the user in the area image on the basis of the finger image;

wherein the determination module 30 is also configured to determine size data of a touch screen, determine a corresponding position to be magnified on the basis of the size data and the position coordinates; and a magnifying module 40 for magnifying screen content of a position area corresponding to the position to be magnified on the basis of the magnifier function.

Further, the determination module 30 is also configured to determine pixel data of the area image and size data of the touch screen, determine corresponding position mapping multiple according to the pixel data and the size data, and determine a position to be magnified in the touch screen according to the position coordinates and the position mapping multiple.

The determination module 30 is also configured to determine a proportion size of the finger image and the area image, and determine a corresponding distance between the user's finger and the touch screen based on the proportion size; determine a corresponding magnification according to the distance, and magnify screen content of a position area corresponding to the position to be magnified on the basis of the magnifier function and the magnification.

Further, the detecting module 20 is also configured such that if it is detected that a finger image exists in the area image, detects whether the finger image is within a preset edge position of the area image.

The detecting module 20 is also configured such that if it is detected that the finger image is within the preset edge position of the area image, detects whether a image proportion of the finger image in the area image is less than or equal to a preset ratio.

The determination module 30 is also configured such that if it is detected that the image proportion of the finger image in the area image is less than or equal to the preset ratio, determines position coordinates of the finger of the user in the area image on the basis of the finger image.

The determination module 30 is also configured to determine a position relationship between the finger image and the area image, and determine a proportion relationship between the finger image and the area image; and determine position coordinates of the finger of the user in the area image on the basis of the position relationship and the proportion relationship.

The determination module 30 is also configured to determine offset positions corresponding to the finger image, and determine a first moving distance of the finger of the user on the basis of the offset positions.

The determination module 30 is also configured to determine a corresponding moving multiple based on the size data of the touch screen, and determine a second moving distance corresponding to the position to be magnified on the basis of the first moving distance and the moving multiple; and determine a first target position after adjusting the position to be magnified by the second moving distance.

The magnifying module 40 is also configured to magnify screen content of the position area corresponding to the first target position on the basis of the magnifier function.

The detecting module 20 is also configured to detect whether a second target position corresponding to the finger of the user after moving the first moving distance is within a preset area.

The detecting module 20 is also configured such that if it is detected that the second target position is outside the preset area, detects whether the finger of the user exists in the preset area within a first preset duration.

Further, the screen content magnification device further includes:

a turning-off module configured that if it is detected that the finger of the user does not exist in the preset area within the first preset duration, turns off the magnifier function.

Further, the screen content magnification device further includes:

a sending module configured that if it is detected that the finger image does not exist in the area image, sends a prompt message that the finger of the user is not detected.

Further, the detecting module 20 is also configured to detect whether the finger of the user exists in the preset area within a second preset duration.

The turning-off module is also configured such that if it is detected that the finger of the user does not exist in the preset area within the second preset duration, turns off the magnifier function.

The specific implementation of the screen content-based magnification device of the present disclosure is basically the same as the embodiments of the screen content-based magnification method described above, which will not be repeated herein.

Figure 6:
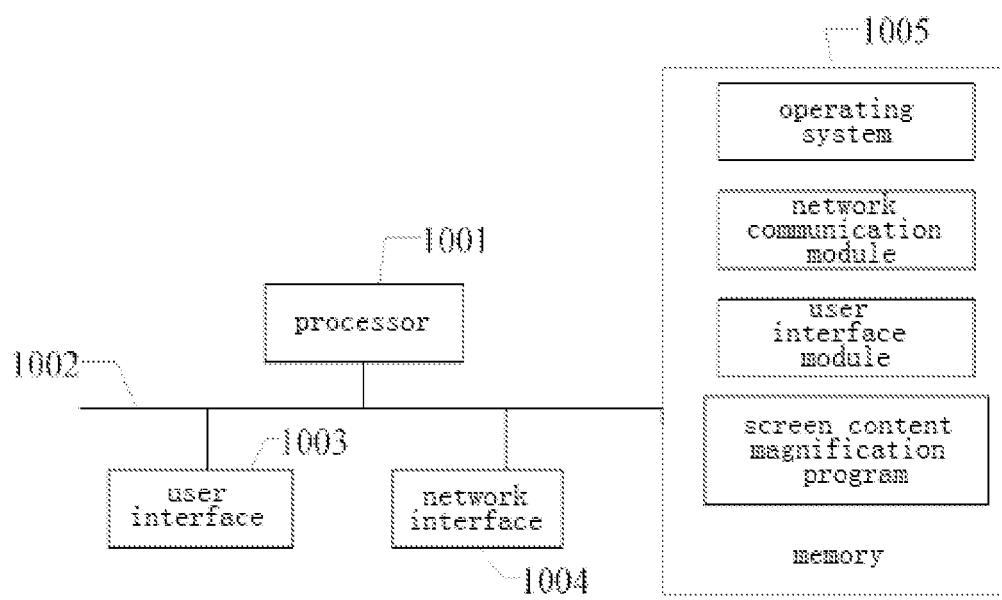
FIG. 6 is a structural diagram of a hardware operating environment involved in the embodiment of the present disclosure.

Further, the present disclosure also provides an electronic device. As shown in FIG. 6, FIG. 6 is a structural diagram of a hardware operating environment involved in the embodiment of the present disclosure.

It should be noted that FIG. 6 may be a structural diagram of a hardware operating environment of an electronic device.

As shown in FIG. 6, the electronic device may include: a processor 1001, such as a central processing unit (CPU), a memory 1005, a user interface 1003, a network interface 1004, and a communication bus 1002. The user interface 1003 may include a display, an input unit such as a board. Optionally, the user interface 1003 may include a standard wired interface such as a universal serial bus (USB) interface, a wireless interface such as a Bluetooth interface. Optionally, the network interface 1004 may include a standard wired interface and a wireless interface (such as a WI-FI ((Wireless-Fidelity)) interface). The memory 1005 may be a high-speed RANI memory, or a non-volatile memory (such as a magnetic disk memory). Optionally, the memory 1005 may be a storage device independent of the aforementioned processor 1001.

Optionally, the electronic device may further include a radio frequency (RF) circuit, a sensor, a Wi-Fi module, and the like.

It will be understood by those skilled in the art that the structure of the electronic device shown in FIG. 6 does not constitute a limitation on the electronic device, and may include more or less components than shown in the figure, or may combine some components, or may have different arrangement of components.

As shown in FIG. 6, the memory 1005, as a computer storage medium, may include an operation device, a network communication module, a user interface module, and a screen content magnification program. Wherein, the operation device is a program that manages and controls hardware and software resources of the electronic device, and supports running of the screen content magnification program and other software or programs.

In the electronic device shown in the figure, the user interface 1003 is mainly used for the touch module to identify the number of clicks of the user; the network interface 1004 is mainly used for the central processing unit to communicate data with the touch module and the camera device; the processor 1001 may be used to call the screen content magnification program stored in the memory 1005 and complete the above-mentioned steps of the control method of the electronic device.

The specific implementation of the electronic device of the present disclosure is basically the same as the embodiments of the screen content magnification method described above, which will not be repeated herein.

Further, the embodiment of the present disclosure also proposes a computer readable storage medium, wherein a screen content magnification program is stored on the computer readable storage medium, and wherein when the screen content magnification program is executed by a processor, steps of the screen content magnification method as described above are implemented.

The specific implementation of the computer readable storage medium of the present disclosure is basically the same as the embodiments of the screen content magnification method described above, which will not be repeated herein.

It should also be noted that terms "including", "comprising", or any other variant thereof are intended to cover non exclusive inclusion, so that a process, method, article, or device including a series of elements not only includes those elements, but also includes other elements not explicitly listed, or also includes elements inherent to such process, method, article or device. Without further restrictions, the element defined by the statement "include a . . . " do not exclude the presence of another identical elements in the process, method, article, or device including the element.

The serial numbers of the above embodiments of the present disclosure are for description only, and do not represent the advantages and disadvantages of the embodiments.

Through the description of the above embodiments, those skilled in the art can clearly understand that the method of the above embodiments can be implemented by means of software plus a necessary general hardware platform, and of course also by hardware, but the former is a better embodiment for a case of many data. Based on this, the essence or the part of the technical solution of the present disclosure that contributes to the prior art may be embodied in the form of software goods, the computer software goods are stored in a storage medium (such as a ROM/RAM, a disk, a optical disk), and include several instructions to enable an electronic device to complete the method described in various embodiments of the present disclosure.

What is claimed is:

1. A screen content magnification method, comprising:
    starting a magnifier function after a starting instruction of the magnifier function is detected, turning on a camera device to acquire an image area of a preset area, and detecting whether a finger image corresponding to a finger of a user exists in the image area, wherein the preset area is an area directly above the camera device and at a preset distance from a touch screen;
    detecting that a finger image exists in the image area, and determining position coordinates of the finger of the user in the image area on the basis of the finger image;
    determining size of the touch screen, determining a corresponding position to be magnified on the basis of the size and the position coordinates, and magnifying screen content of a position area corresponding to the position to be magnified on the basis of the magnifier function;
    determining offset positions corresponding to the finger image, and determining a moving direction and a first moving distance of the finger of the user on the basis of the offset positions;
    determining a corresponding moving multiple based on the size of the touch screen, and determining a second moving distance corresponding to the position to be magnified on the basis of the first moving distance and the moving multiple, wherein the size is determined according to device parameters of an electronic device on which the touch screen is installed, and the moving multiple of the touch screen is determined according to a size magnification list in which the size is mapped with the corresponding moving multiple; and
    determining a first target position after adjusting the position to be magnified by the second moving distance, and magnifying screen content of the position area corresponding to the first target position on the basis of the magnifier function.

2. The screen content magnification method of claim 1, wherein the determining the size of the touch screen, and the determining the corresponding position to be magnified on the basis of the size and the position coordinates comprises:
    determining pixel data of the image area and the size of the touch screen, and determining corresponding position mapping multiple according to the pixel data and the size; and
    determining a position to be magnified in the touch screen according to the position coordinates and the position mapping multiple.

3. The screen content magnification method of claim 1, wherein the magnifying screen content of the position area corresponding to the position to be magnified on the basis of the magnifier function comprises:
    determining a proportion size of the finger image and the image area, and determining a corresponding distance between the user's finger and the touch screen based on the proportion size; and
    determining a corresponding magnification according to the distance, and magnifying the screen content of a position area corresponding to the position to be magnified on the basis of the magnifier function and the magnification.

4. The screen content magnification method of claim 1, wherein the detecting that the finger image exists in the image area, and the determining position coordinates of the finger of the user in the image area on the basis of the finger image comprises:
    detecting that a finger image exists in the image area, and detecting whether the finger image is within a preset edge position of the image area;
    detecting that the finger image is within the preset edge position of the image area, and detecting whether an image proportion of the finger image in the image area is less than or equal to a preset ratio; and
    detecting that the image proportion of the finger image in the image area is less than or equal to the preset ratio, and determining position coordinates of the finger of the user in the image area on the basis of the finger image.

5. The screen content magnification method of claim 4, wherein the determining position coordinates of the finger of the user in the image area on the basis of the finger image comprises:
   determining a position relationship between the finger image and the image area, and determining a proportion relationship between the finger image and the image area; and
   determining position coordinates of the finger of the user in the image area on the basis of the position relationship and the proportion relationship.

6. The screen content magnification method of claim 1, wherein after the determining offset positions corresponding to the finger image, and determining a first moving distance of the finger of the user on the basis of the offset positions, the method further comprises:
   detecting whether a second target position corresponding to the finger of the user after moving the first moving distance is within a preset area;
   detecting that the second target position is outside the preset area, and detecting whether the finger of the user exists in the preset area within a first preset duration; and
   detecting that the finger of the user does not exist in the preset area within the first preset duration, and turning off the magnifier function.

7. The screen content magnification method of claim 1, wherein after the detecting whether the finger image corresponding to the finger of the user exists in the image area, the method further comprises:
   detecting that the finger image does not exist in the image area, and sending a prompt message that the finger of the user is not detected;
   detecting whether the finger of the user exists in the preset area within a second preset duration; and
   detecting that the finger of the user does not exist in the preset area within the second preset duration, turning off the magnifier function.

8. An electronic device, wherein the electronic device comprises a memory, a processor, and a screen content magnification program stored in the memory and executable on the processor, the screen content magnification program, when executed by the processor, implementing steps of the screen content magnification method of claim 1.

9. A computer readable storage medium having a screen content magnification program stored thereon, the screen content magnification program, when executed by a processor, implementing steps of the screen content magnification method of claim 1.

* * * * *